FIG.6.

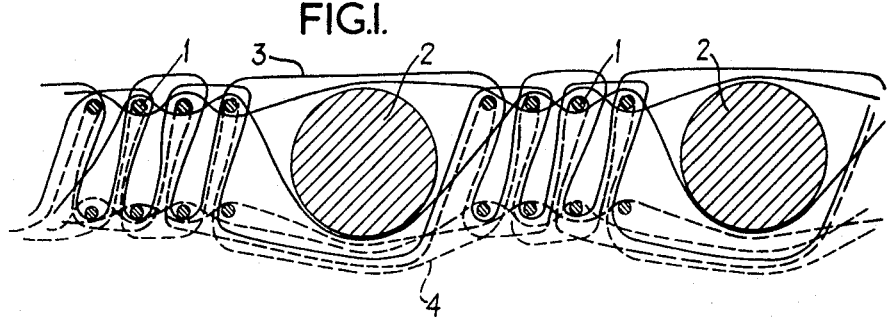
FIG.1.
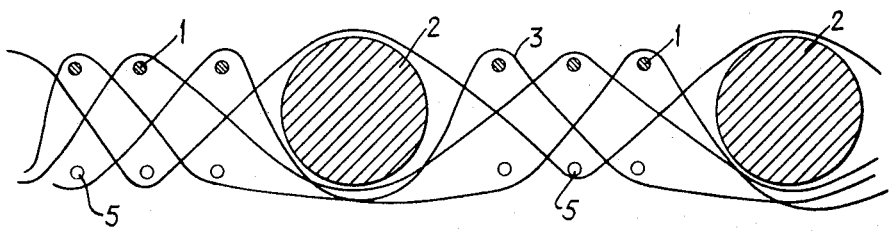
FIG.2.

United States Patent Office 3,741,855
Patented June 26, 1973

---

3,741,855
LOW FRICTION BEARING MATERIALS
Michael Banks Harrison, Bristol, and Robert Benion, Clevedon, Somerset, England, assignors to AMPE Industrial Products Limited, Somerset, England
Filed May 18, 1971, Ser. No. 144,560
Int. Cl. D03d 15/10
U.S. Cl. 161—91    9 Claims

ABSTRACT OF THE DISCLOSURE

A bearing material comprises a woven fabric of mixed fibres of low friction material and fibres of high modulus material and particularly, carbon fibres.

---

Figure 3:
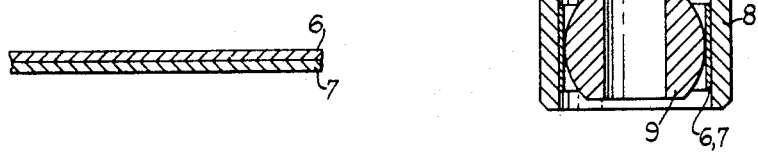

This invention relates to low friction bearing materials and to methods of constructing bearings from these materials. Low friction materials, for example fibres of a fluorocarbon e.g. polytetrafluoroethylene, have been used effectively in the form of fabrics either with or without a synthetic resin binder as a low friction bearing material (see, for example, patent specification No. 845,547) and coefficients of friction at low rubbing velocities and at bearing pressures between 10,000 and 60,000 p.s.i. have frequently been reported as low as 0.03.

It has been established that at the very high bearing pressures encountered in present day aerospace technology, i.e. 30,000 p.s.i. and upwards, initial clearance rapidly develops in woven p.t.f.e. fabric bearings, which results in time lag in control responses and sometimes loss of stiffness in control surface hinges. This initial clearance is thought to develop as a result of a viscous layer of p.t.f.e. adhering to the bearing counterface flowing from the crests of the woven fabric into the interstices, plus some p.t.f.e. in the form of debris which is expelled from the bearing assembly.

New materials, for example high modulus or high strength carbon fibres, are known to possess excellent stiffness characteristics with synthetic resin binders as bearing materials and marked reductions in the wear rate of these newer bearing materials have been reported.

An object of the present invention is to provide a bearing material having both low friction and good initial wear characteristics, with increased stiffness.

According to the present invention, a bearing material is composed of, or incorporates, a woven fabric of mixed fibres of low friction material and fibres of high modulus material.

The term "high modulus material" is used herein to denote a material having a Youngs modulus not less than $30 \times 10^6$.

The fibres of the fabric may be coated with a resin binder to further increase the stiffness of the bulk material, and to act as an adhesive to adhere the bearing material to a backing element if required. The resin binder may be thermoplastic or thermosetting, the resulting material comprising a compact fabric of mixed yarns intimately linked with resin binder.

The proportion of low friction material to the total weight of fabric may vary as widely as 1–99% depending upon the bearing characteristics required.

Preferably, the low friction material is a fluorocarbon, e.g. p.t.f.e. and the fibres of stiffening material, high modulus or high strength carbon fibres. In this connection carbon fibres are classified as "high modulus" (type 1) and "high strength" (type 2) but both types fall within the definition of "high modulus" above. In fact the ultimate tensile strength of type 1 carbon fibres is $200-300 \times 10^3$ p.s.i. and the Youngs modulus of this particular fibre is $55-65 \times 10^6$, whereas the respective figures for the type 2 fibre are $350-450 \times 10^3$ p.s.i. and $35-45 \times 10^6$, hence their qualifications "high modulus" and "high strength" respectively. It will be appreciated, that the stiffening material reinforces the bearing material to improve its load bearing characteristics.

Figure 4:
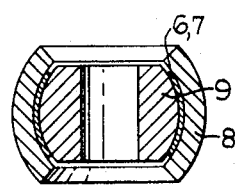
Figure 5:
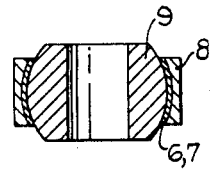

In order that the invention may be more fully understood two fabrics in accordance with the invention will now be described by way of example with reference to the accompanying drawings, in which, FIG. 1 illustrates a greatly enlarged cross-section through one of the fabrics, FIG. 2 shows a similar view of a section through the other fabric, FIG. 3 shows a sectional view of either of the fabrics of FIGS. 1 and 2 laminated with a backing material, and FIGS. 4, 5 and 6, show a self-aligning bearing incorporating the bearing laminate in stages of manufacture.

Referring to FIG. 1, the fabric is woven with a mixture of polytetrafluoroethylene yarns 1 and 1000 filament high strength carbon fibre yarns 2 in the bearing surface. In this fabric, the carbon fibre yarns are confined to the warp ends and are sized with a thermosetting resin solution, prior to weaving to prevent filament fracture. The fabric incorporates both p.t.f.e. weft picks 3 and glass weft picks 4 and in fact the textile design specifications are as follows:

| Face: | | |
|---|---|---|
| Warp ends | {80 | 200 denier p.t.f.e. |
| | 10 | 1,000 filament carbon fibre. |
| Weft picks | 65 | 200 denier p.t.f.e. |
| Reverse side: weft picks | 65 | Glass yarns. |

The fabric of FIG. 2 is basically the same as that in FIG. 1 except that no glass weft picks are included although some glass warp ends 5 are employed on the reverse side of the fabric in place of p.t.f.e. warp ends. The purpose of including in both FIGS. 1 and 2 glass yarns instead of p.t.f.e. yarns is to reduce the cost of the materials. The specification of the fabric of FIG. 2 is as follows:

| Face: | | |
|---|---|---|
| Warp ends | {30 | 400 denier p.t.f.e. |
| | 10 | 1,000 filament carbon fibre. |
| Weft picks | 78 | 400 denier p.t.f.e. |
| Reverse side: Warp ends | 30 | Glass fibre yarn. |

After removing the size from the fabric, either fabric may be laminated to phenol formaldehyde thermosetting resin pre-impregnated glass fabric to form a two-ply layer with the p.t.f.e./carbon yarn faces uppermost as illustrated in FIG. 3, where the p.t.f.e./carbon fabric is referenced 6 and the glass fabric is referenced 7.

In a preferred use of the bearing material (referring now to FIGS. 4, 5 and 6), the two-layer fabric in a flexible or semi-cured state is fitted into a metal sleeve 8 with or without an adhesive coating, and a spherical member 9 inserted in the lined sleeve. The sleeve is then plastically deformed (FIG. 5) in hemispherical dies and then the assembly heated to cure the resin system, the deformation being such that the outer sleeve exerts adequate pressure on the entrapped bearing material to achieve the required bonding pressure and/or cured condition during this curing stage. The spherical member is broken loose in the assembly after curing the bearing material, this being assisted by the prior coating of the spherical member with a suitable release agent if required. The self aligning bearing so formed may be completed by the further machining (FIG. 6) of the plastically deformed outer member.

Bearings thus produced have been dynamically tested by applying a unidirectional constant load to the outer race member, while oscillating the spherical inner member through an angle of $\pm 25°$ at frequencies of 10 and 40 cycles per minute. The bearing surface stress was 25,000 p.s.i., calculated from the projected area at the load applied.

In order to demonstrate the improved bearing properties of bearing material of the invention, the same tests were also performed on standard bearings used by the aerospace industry which embody bearing fabrics having 100% p.t.f.e. yarns in a woven face. The results of these tests were as follows:

|  | No. of cycles | Frequency in cycles/ minute | Wear in inches |
|---|---|---|---|
| 100% p.t.f.e. yarn in face | 26,900 | 10 | .0044 |
|  | 76,465 | 40 | .0067 |
|  | 76,465 | 40 | .0070 |
| P.t.f.e./carbon fibre fabric as— |  |  |  |
| Figure 1 | 26,900 | 10 | .0010 |
| Figure 2 | 132,960 | 40 | .0028 |
|  | 132,960 | 40 | .0022 |

The test results in this example show that the combined p.t.f.e./carbon fibre fabrics exhibit lower wear values than the 100% p.t.f.e. bearing face materials in current use.

The adhesive or resin coated fabric in a flexible or partially cured state may be fitted into a metal housing, with or without an adhesive coating, and an interference fit tool form introduced to exert adequate moulding and/or bonding pressure to the bearing surface. The assembly is then raised to the required processing temperature to achieve the required bonding and/or cured condition. After cooling and removing the tool, the bearing assembly can be used in its present condition if sufficiently dimensionally accurate, or be subsequently machined if greater accuracy is required.

We claim:

1. A bearing material comprising a fabric woven from yarns of low-friction material fibre and yarns of high-modulus carbon fibre.

2. A bearing material as set forth in claim 1 wherein the high modulus carbon fibre has a Youngs modulus of at least $30 \times 10^6$.

3. A bearing material as set forth in claim 1, in which the fibres are coated with a resin and the bearing material comprises also a backing material to which the fabric is secured by the resin.

4. A bearing material as set forth in claim 1, in which the low friction material is a fluorocarbon.

5. A bearing material as set forth in claim 4, in which the low friction material is polytetrafluoroethylene.

6. A bearing material as set forth in claim 3, in which the backing material is a resin impregnated glass fabric.

7. A bearing material as set forth in claim 5, in which the fabric is composed of polytetrafluoroethylene yarn and carbon fibre yarn warp ends with polytetrafluoroethylene yarn and glass yarn weft picks.

8. A bearing material as set forth in claim 5, in which the fabric is composed of polytetrafluoroethylene yarn carbon fibre yarn and glass yarn warp ends with polytetrafluoroethylene yarn weft picks.

9. A bearing incorporating the bearing material of claim 1.

References Cited

UNITED STATES PATENTS

| 2,983,562 | 5/1961 | Runton et al. | 308—238 |
| 3,068,053 | 12/1962 | Runton et al. | 308—238 |
| 3,155,566 | 11/1964 | Fisher | 308—238 X |
| 3,163,475 | 12/1964 | Litsky | 308—238 X |
| 3,261,737 | 7/1966 | Stevens | 308—238 X |
| 3,304,221 | 2/1967 | Eggletor | 308—238 X |
| 3,347,737 | 10/1967 | Harford | 308—238 X |
| 3,458,223 | 7/1969 | White | 308—238 X |
| 3,501,360 | 3/1970 | Mancel | 308—238 X |
| 3,536,367 | 10/1970 | Papish | 308—238 |
| 3,616,188 | 10/1971 | Mancel | 308—238 |

OTHER REFERENCES

Bacon et al.: "Use of Carbon Fiber," Modern Plastics Encyclopedia, 1967 edition 9–1966, pp. 608–610.

Epremian: "Graphite Filaments Spur New "Composites' Industry," Modern Textiles Magazine, June 1969, pp. 28, 30 and 33.

GEORGE F. LESMES, Primary Examiner

J. J. BELL, Assistant Examiner

U.S. Cl. X.R.

161—93, 96, 189; 308—238, DIG. 8